United States Patent
Satyanarayana et al.

(10) Patent No.: US 11,246,011 B1
(45) Date of Patent: Feb. 8, 2022

(54) CELLULAR ACCESS OF USER-DEFINED NETWORKS

(71) Applicant: Cisco Technology, Inc., San Jose, CA (US)

(72) Inventors: Mahesh Satyanarayana, Fremont, CA (US); Abhishek Dhammawat, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/036,130

(22) Filed: Sep. 29, 2020

(51) Int. Cl.
  *H04W 4/08* (2009.01)
  *H04W 40/02* (2009.01)
  *H04L 12/707* (2013.01)
  *H04L 12/18* (2006.01)

(52) U.S. Cl.
  CPC ............ *H04W 4/08* (2013.01); *H04L 12/185* (2013.01); *H04L 45/24* (2013.01); *H04W 40/023* (2013.01)

(58) Field of Classification Search
  CPC ........... H04W 4/06; H04W 4/08; H04W 4/18; H04W 4/30; H04W 40/023; H04L 12/16; H04L 12/18; H04L 12/185; H04L 45/24
  See application file for complete search history.

(56) References Cited

U.S. PATENT DOCUMENTS

| | | | | |
|---|---|---|---|---|
| 10,820,162 B2* | 10/2020 | Gupta | ................... | H04L 63/102 |
| 2003/0037033 A1* | 2/2003 | Nyman | ............... | H04L 61/3065 |
| 2007/0214246 A1* | 9/2007 | Venkataswami | ... | H04N 21/6405 709/223 |
| 2012/0230282 A1* | 9/2012 | Wu | ........................ | H04W 28/16 370/329 |
| 2013/0188514 A1* | 7/2013 | Jain | ....................... | H04L 41/042 370/254 |
| 2014/0233380 A1* | 8/2014 | Kim | ........................ | H04L 47/24 370/230 |
| 2015/0334634 A1* | 11/2015 | Jiang | ....................... | H04W 4/20 370/329 |
| 2016/0006606 A1* | 1/2016 | Zhu | ........................ | H04W 24/04 370/338 |
| 2019/0020491 A1* | 1/2019 | Boutros | .............. | H04L 12/1886 |
| 2019/0215724 A1 | 7/2019 | Talebi Fard et al. | | |

(Continued)

OTHER PUBLICATIONS

Cisco, "Cisco User Defined Network: Security and Control on a Shared Network", C05-743656-00, May 2020, 4 pages.

(Continued)

*Primary Examiner* — Kevin D Mew
(74) *Attorney, Agent, or Firm* — Edell, Shapiro & Finnan, LLC

(57) ABSTRACT

Techniques are described herein for providing cellular access of a user-defined network. In one example, a user plane function of a cellular network obtains, from a control plane function of the cellular network, an indication that a first user equipment is attempting to connect to a user-defined network via the cellular network. The user plane function joins a multicast group configured to include a second user equipment connected to the user-defined network via a wireless local area network. The user plane function obtains a multicast packet that is transmitted between the first user equipment and the second user equipment and that is addressed to the multicast group, and converts the multicast packet to a unicast packet.

20 Claims, 5 Drawing Sheets

(56) References Cited

U.S. PATENT DOCUMENTS

| | | |
|---|---|---|
| 2019/0230556 A1 | 7/2019 | Lee |
| 2020/0029388 A1 | 1/2020 | Dao et al. |
| 2020/0053190 A1* | 2/2020 | Uddin ................... H04L 69/18 |
| 2020/0128503 A1 | 4/2020 | Li et al. |
| 2020/0245272 A1* | 7/2020 | Hong ..................... H04W 4/40 |
| 2020/0245381 A1 | 7/2020 | Talebi Fard et al. |
| 2021/0120315 A1* | 4/2021 | Makinen .......... H04N 21/23106 |
| 2021/0218587 A1* | 7/2021 | Mishra ................ H04L 12/1886 |

OTHER PUBLICATIONS

Cisco, "Cisco User Defined Network FAQ", C67-743572-01, Jul. 2020, 5 pages.

Wikipedia, "Multimedia Broadcast Multicast Service", https://en.wikipedia.org/wiki/Multimedia_Broadcast_Multicast_Service, Apr. 9, 2020, 6 pages.

Wikipedia, "Multicast-broadcast single-frequency network", https://en.wikipedia.org/wiki/Multicast-broadcast_single-frequency_network, Jun. 13, 2019, 3 pages.

Cisco Systems, Inc., "User Guide for Cisco User Defined Network Mobile Application", Jun. 5, 2020, 48 pages.

Cisco, "User Defined Network", Prescriptive Deployment Guide, Jul. 2020, 105 pages.

Apple, Inc , "How to use multicast networking in your app", https://developer.apple.com/news/?id=0oi77447, Jun. 22, 2020, 6 pages.

Cisco, "Bonjour", downloaded Sep. 2, 2020, 1 page.

* cited by examiner

CELLULAR ACCESS OF USER-DEFINED NETWORKS

TECHNICAL FIELD

The present disclosure relates to telecommunications technology.

BACKGROUND

A User-Defined Network (UDN) may segment one or more user devices within a network. Each user may be provided with a private UDN in which only devices registered by the user are allowed to communicate with each other. Users may create and register devices to a UDN through a UDN mobile application.

DESCRIPTION OF EXAMPLE EMBODIMENTS

Overview

Techniques are described herein for providing cellular access of a user-defined network. In one example embodiment, a user plane function of a cellular network obtains, from a control plane function of the cellular network, an indication that a first user equipment is attempting to connect to a user-defined network via the cellular network. The user plane function joins a multicast group configured to include a second user equipment connected to the user-defined network via a wireless local area network. The user plane function obtains a multicast packet that is transmitted between the first user equipment and the second user equipment and that is addressed to the multicast group, and converts the multicast packet to a unicast packet.

Example Embodiments

Figure 1:
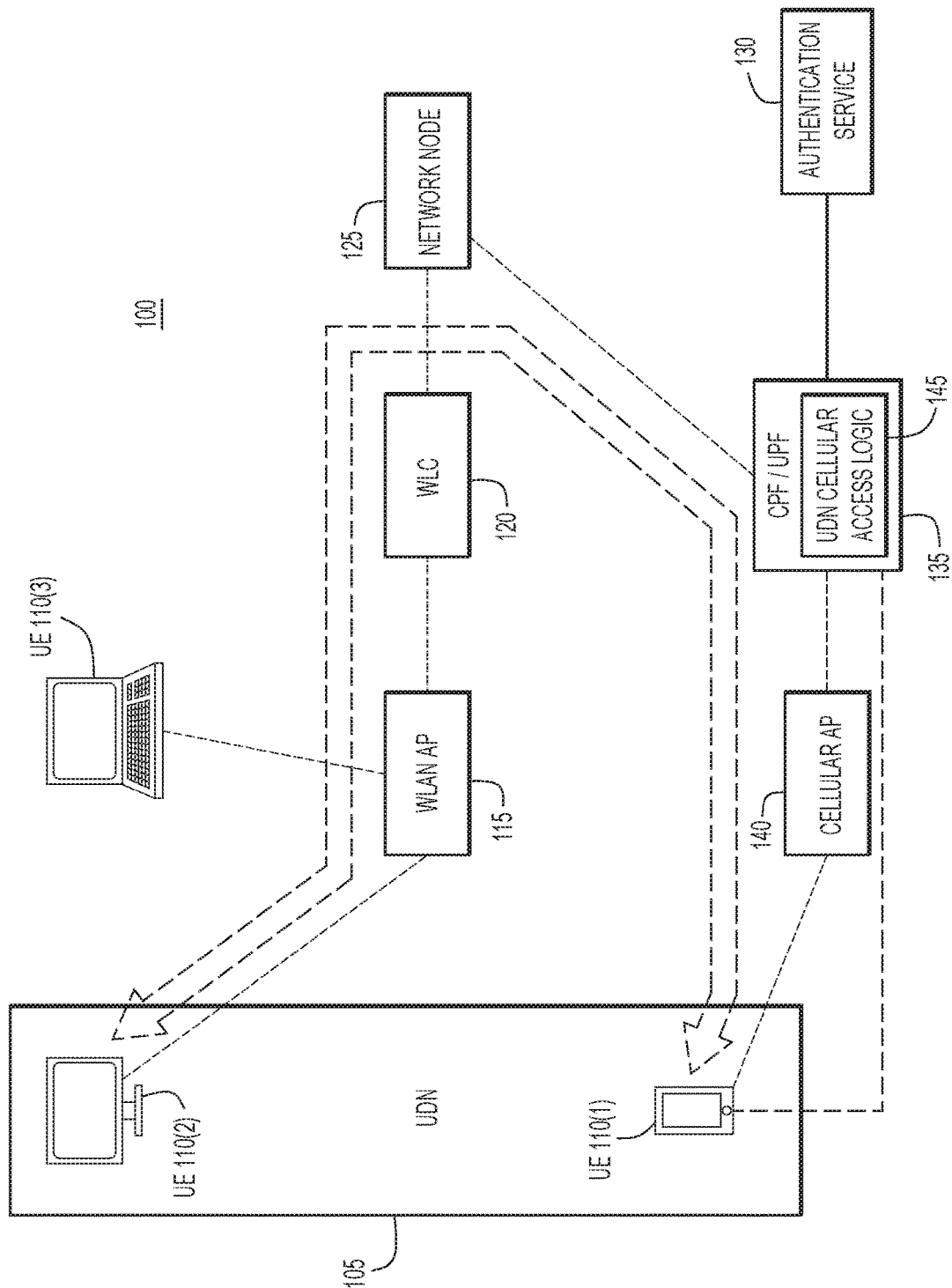
FIG. 1 illustrates a block diagram of a system configured to provide cellular access of a User-Defined Network (UDN), according to an example embodiment.

FIG. 1 illustrates a block diagram of an example system 100 configured to provide cellular access of User-Defined Network (UDN) 105. System 100 includes User Equipments (UEs) 110(1)-110(3), Wireless Local Area Network (WLAN) Access Point (AP) 115, WLAN Controller (WLC) 120, network node 125, authentication service 130, co-located Control Plane Function (CPF) and User Plane Function (UPF) (referred to herein as "CPF/UPF") 135, and cellular AP 140.

UEs 110(1)-110(3) may be associated with any suitable device configured to initiate a flow in system 100. For example, UEs 110(1)-110(3) may include a computer, a vehicle and/or any other transportation-related device having electronic devices configured thereon, an automation device, an enterprise device, an appliance, an Internet of Things (IoT) device, a Personal Digital Assistant (PDA), a laptop or electronic notebook, a cellular telephone, a smartphone, a tablet, an Internet Protocol (IP) phone, a smart doorbell, and/or any other device and/or combination of devices, components, elements, and/or objects capable of initiating voice, audio, video, media, or data exchanges within system 100. UEs 110(1)-110(3) may also include any suitable interface to a human user such as a microphone, a display, a keyboard, or other terminal equipment. UEs 110(1)-110(3) may also be any device that seeks to initiate a communication on behalf of another entity or element such as a program, a database, or any other component, device, element, or object capable of initiating an exchange within system 100. UEs 110(1)-110(3) may be configured with appropriate hardware (e.g., processor(s), memory element(s), antennas and/or antenna arrays, baseband processors (modems), and/or the like), software, logic, and/or the like to facilitate respective over-the-air (air) interfaces for accessing/connecting to WLAN AP 115 and/or cellular AP 140. In one example, UEs 110(1)-110(3) may be configured to connect to a WLAN (e.g., through WLAN AP 115), and initially, UEs 110(1)-110(3) may be part of the WLAN (e.g., a Wi-Fi® network offered in a corporate, enterprise, or dorm room environment). UE 110(1), but not UEs 110(2) or 110(3), may be further configured to connect to a cellular network (e.g., through cellular AP 140). It will be appreciated that any number of UEs may be present in system 100.

WLAN AP 115 may be configured with appropriate hardware (e.g., processor(s), memory element(s), antennas and/or antenna arrays, baseband processors (modems), and/or the like), software, logic, and/or the like to provide over-the-air coverage for a WLAN (e.g., a Wi-Fi network). In various embodiments, one or more of WLAN AP 115 may be implemented as Wi-Fi APs and/or the like.

WLC 120 may be a control plane entity that provides or is responsible for WLAN functions such as WLAN-based access authentication services, authorization services, intrusion prevention, Radio Frequency (RF) management, and/or the like to facilitate UE connectivity via WLAN AP 115. Network node 125 may be any suitable networking device, such as a multicast router that is part of a wired network. Network node 125 may be part of (e.g., provide connectivity to) an enterprise access network. Authentication service 130 may be configured to perform UE authentication operations. In one specific example, authentication service 130 may include at least part of one or more of a digital network architecture, identity services engine, Policy Control Function (PCF), Home Subscriber Server (HSS), etc.

CPF/UPF 135 may include a CPF of a cellular network and a UPF of the cellular network. The CPF may include an Access and Mobility Management Function (AMF) and/or a Session Management Function (SMF). While AMF and SMF are 5G elements, the CPF may include any suitable cellular control plane entity/entities of any suitable cellular generation (e.g., 3G, 4G, etc.). The UPF may include any suitable cellular user plane entity/entities of any cellular generation, such as a 5G UPF, or any suitable cellular user plane entity/entities of any suitable cellular generation. Although illustrated as a co-located CPF and UPF, in some embodiments CPF/UPF 135 may be separated into the CPF and the UPF. The CPF may include co-located or separate components, such as the AMF and the SMF.

Cellular AP 140 may be one or more cellular APs that terminate a cellular (e.g., 4G Long-Term Evolution (LTE) or 5G New Radio (NR)) air interface and may be configured with appropriate hardware (e.g., processor(s), memory element(s), antennas and/or antenna arrays, baseband processors (modems), and/or the like), software, logic, and/or the like to provide over-the-air coverage for a private cellular access network (e.g., private 4G LTE, private 5G NR, private Citizens Broadband Radio Service (CBRS), etc.). By 'private' it is meant that a private cellular access network provides network connectivity/services to clients (e.g., UEs 110(1)-110(3)) served by a network operator and/or service provider of the private cellular access network, such as an enterprise. In one example, a private cellular access network may be considered to be a network that may be implemented to serve enterprise purposes (e.g., business purposes, government purposes, educational purposes, etc.) for enterprise clients (e.g., enterprise users/devices/etc.) in which the private cellular access network may be operated by any combination of traditional mobile network operators/service providers, enterprises network operators/service providers, and/or third party network operators/service providers (e.g., neutral host network operators/service providers, cloud service providers, etc.). In various embodiments, cellular AP 140 may be implemented as any combination of an evolved Node B (eNB) to facilitate 4G LTE air accesses, a next generation Node B (gNB) to facilitate 5G NR air accesses, a next generation (nG) radio to facilitate any next generation air accesses, a CBRS Device (CBSD) to facilitate CBRS accesses, and/or the like now known or hereafter developed. Although illustrated as separate APs, in some embodiments WLAN AP 115 and cellular AP 140 may be co-located to provide any combination of cellular and WLAN accesses.

In one specific example, UE 110(1) may be a smart phone owned by a first user, UE 110(2) may be a smart television owned by the first user, and UE 110(3) may be a laptop owned by a second user. UDN 105 may be a personal, secure network to which the first user can add given UEs (e.g., UEs 110(1) and 110(2)). The first user may create UDN 105 and add UEs 110(1) and 110(2) thereto using a software application, such as a mobile application downloadable to UE 110(1). The software application may cause UE 110(1) to scan the common/shared network for shareable UEs and display an indication of such UEs. In this example, UE 110(1) detects UEs 110(2) and 110(3) as shareable UEs and displays a list that includes indications of UEs 110(2) and 110(3). The first user selects UE 110(2), but not UE 110(3), to add to UDN 105. Hence, UDN 105 includes UEs 110(1) and 110(2), which are owned by the first user.

UDN 105 renders UEs 110(1) and 110(2) undiscoverable to UE 110(3), which is outside UDN 105. This can be useful for protecting the security of UEs 110(1) and 110(2). After the first user selects UE 110(2) to add to UDN 105, the software application may send, to authentication service 130, an identification of UDN 105 and identifications of UEs 110(1) and 110(2) (e.g., Media Access Control (MAC) addresses) to indicate that UEs 110(1) and 110(2) are members of UDN 105. Authentication service 130 pushes the identification of UDN 105 and the identifications of UEs 110(1) and 110(2) to WLC 120, which in turn sends the same to WLAN AP 115. Upon receiving the identification of UDN 105 and the identifications of UEs 110(1) and 110(2), WLAN AP 115 is aware that UEs 110(1) and 110(2) belong to UDN 105 and can enforce policies to ensure that UEs 110(1) and 110(2) are undiscoverable by UE 110(3).

In particular, WLAN AP 115 may restrict discovery packets (e.g., multicast traffic) that advertise the existence of UEs that belong to UDN 105 (e.g., UEs 110(1) and 110(2)) to only those UEs that belong to UDN 105 (e.g., UEs 110(1) and 110(2)). For example, when UE 110(1) sends a downlink multicast packet to WLAN AP 115 indicating that UE 110(1) is discoverable, WLAN AP 115 may determine, based on the information received from authentication service 130, that UEs 110(1) and 110(2) (but not UE 110(3)) are members of an Internet Group Management Protocol (IGMP) group corresponding to the identification of UDN 105. Accordingly, WLAN AP 115 performs Multicast-to-Unicast (MC2UC) conversion of the multicast packet and sends the unicast packet to UE 110(2) but not to UE 110(3). Thus, UE 110(2) can discover and access UE 110(1), but UE 110(3) cannot.

Similarly, when UE 110(2) sends a downlink multicast packet to WLAN AP 115 indicating that UE 110(2) is discoverable, WLAN AP 115 performs Multicast-to-Unicast (MC2UC) conversion of the multicast packet and sends the unicast packet to UE 110(1) but not to UE 110(3). Thus, UE 110(1) can discover and access UE 110(2), but UE 110(3) cannot. By contrast, when UE 110(3) sends a multicast packet to WLAN AP 115 indicating that UE 110(3) is discoverable, WLAN AP 115 sends the discovery packet to all other UEs in the WLAN, including both UEs within UDN 105 (e.g., UEs 110(1) and 110(2)) and any other UEs in the WLAN that are outside UDN 105.

Conventionally, UDN 105 would only be supported in Wi-Fi and software-defined access fabric wired networks. As noted above, UEs 110(1) and 110(2) are initially in the WLAN, but UE 110(1) is configured to connect to both the WLAN (e.g., through WLAN AP 115) and a cellular network (e.g., through cellular AP 140). Conventionally, if UE 110(1) roams from the WLAN to the cellular network after establishing and joining UDN 105, UE 110(1) would effectively move out of UDN 105 by virtue of moving out of the WLAN. This is because, conventionally, there is no entity that can forward discovery packets to UE 110(1) when UE 110(1) is in cellular coverage. WLAN AP 115, for example, can only send discovery packets to/from UEs that are in WLAN coverage. Conventionally, once removed from UDN 105, UE 110(1) would no longer be able to discover UE 110(2), thereby disrupting user experience. Similarly, if UE 110(1) was initially connected to the cellular network, then conventionally UE 110(1) would be unable to establish or join UDN 105 and would first need to switch over to WLAN coverage.

Accordingly, UDN cellular access logic 145 is provided on CPF/UPF 135 to extend UDN 105 to cellular coverage. Briefly, UDN cellular access logic 145 may cause CPF/UPF 135 to perform operations to include UE 110(1) in UDN 105 even when UE 110(1) is connected to a cellular network via cellular AP 140. This may provide a cleaner and more uniform user experience for the UDN solution. In one example, the UPF obtains, from the CPF, an indication that UE 110(1) is attempting to connect to UDN 105 via the cellular network. The UPF joins a multicast group configured to include UE 110(2), which is connected to UDN 105 via the WLAN. The UPF obtains a multicast packet that is transmitted between UE 110(1) and UE 110(2) and that is addressed to the multicast group, and converts the multicast packet to a unicast packet.

Although certain embodiments described herein relate to discovery packets, these techniques may apply to any suitable multicast packet. Moreover, these techniques may apply to any suitable scenario, including when UE 110(1) creates/joins UDN 105 via a WLAN and then moves to a cellular network, or when UE 110(1) creates/joins UDN 105 via the cellular network. In one specific example involving an environment wherein Wi-Fi and private 5G networks coexist, UDN 105 may be extended to a 5G packet core (e.g., including CPF/UPF 135) such that a private 5G user (e.g., the first user) can access devices in UDN 105 spread across Wi-Fi and wired networks (e.g., UE 110(2)). Techniques described herein may bridge UDN 105 across Wi-Fi, wired, and private 5G networks by notifying the 5G packet core of UDN 105, which is associated with the first user. These techniques may further involve converting multicast traffic belonging to the first user user to unicast traffic at the 5G packet core. Thus, support for Layer 2/Layer 3 (L2/L3) multicast may be extended from the wired/core network to private 5G UEs, and UDN 105 may be extended to private 5G in order to allow the 5G UEs (e.g., UE 110(1)) to see/discover Wi-Fi or wired UEs that are part of UDN 105.

Figure 2:
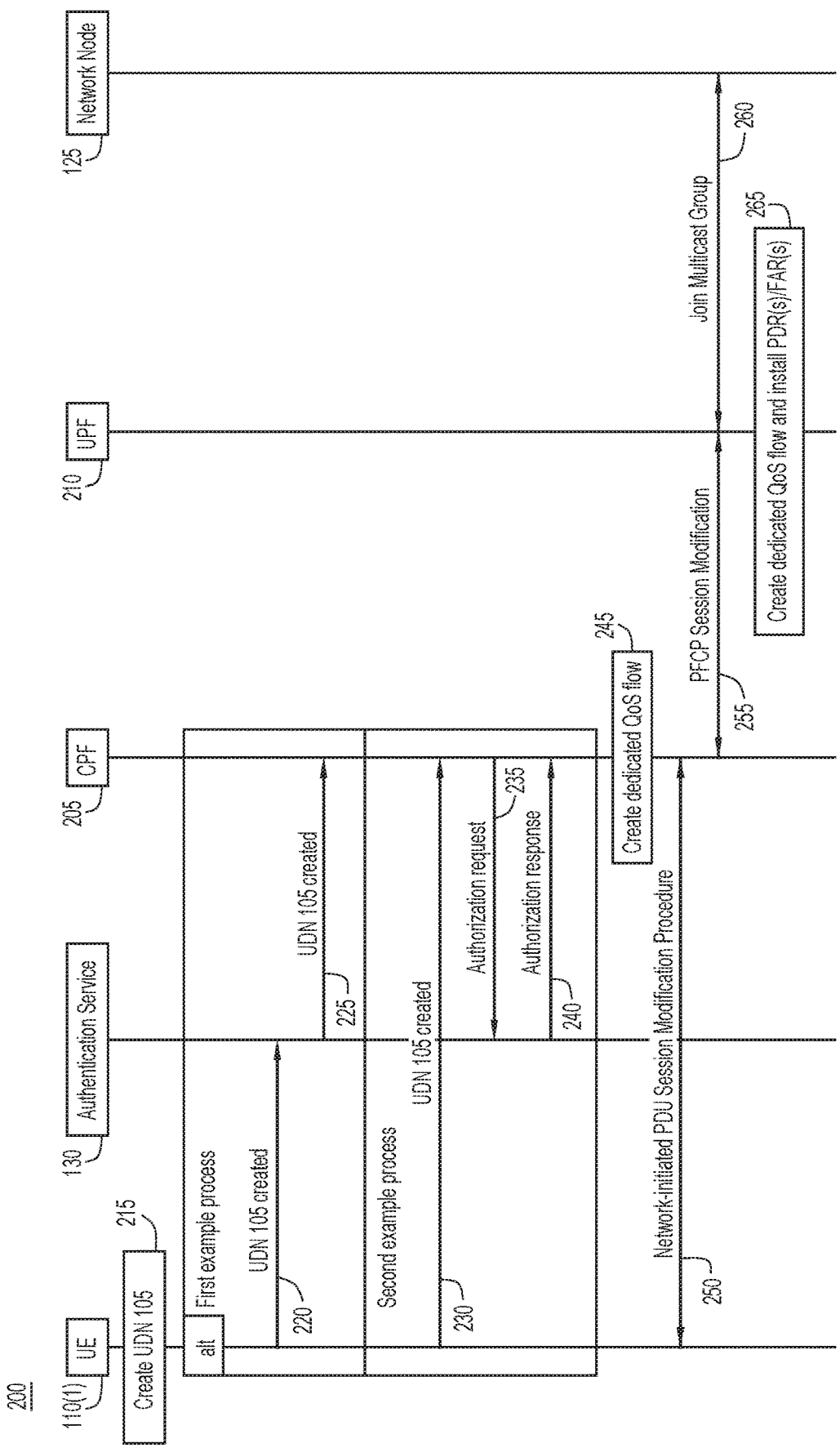
FIG. 2 illustrates a call flow diagram including control plane messages to establish cellular access of a UDN, according to an example embodiment.

With continued reference to FIG. 1, FIG. 2 illustrates an example call flow diagram 200 including control plane messages to establish cellular access of UDN 105. The control plane messages may be transmitted between UE 110(1), authentication service 130, CPF 205 (e.g., the CPF of CPF/UPF 135), UPF 210 (e.g., the UPF of CPF/UPF 135), and network node 125. Briefly, the control plane messages may enable a private 5G user (e.g., the first user) to join and remain in UDN 105.

At operation 215, UE 110(1) creates UDN 105 through the software application and connects to (e.g., registers with) a cellular network (e.g., through cellular AP 140) to establish a Protocol Data Unit (PDU) session. Operations 220 and 225 illustrate a first example process by which CPF 205 may obtain information regarding UDN 105, and operations 230-240 illustrate a second example process by which CPF 205 may obtain information regarding UDN 105. Briefly, in the first example process, CPF 205 obtains a notification that UDN 105 has been created via authentication service 130, and in the second example process, CPF 205 obtains the notification that UDN 105 has been created directly from UE 110(1). In either case, CPF 205 may determine based on the information regarding UDN 105 that UE 110(1) was previously and/or should be a member of UDN 105.

In the first example process, at operation 220, UE 110(1) provides, to authentication service 130, a message indicating that UDN 105 has been created. The message includes an identification of UDN 105 (e.g., a UDN identifier (ID)). Authentication service 130 may authenticate the first user/ UE 110(1) through any suitable mechanism, such as authenticating the Subscriber Identification Module (SIM) card of UE 110(1). At operation 225, CPF 205 obtains, from authentication service 130, a notification that UDN 105 has been created. The notification includes an indication of the multicast group configured to include UE 110(2) (e.g., Multicast Group ID (MGID), multicast group address, etc.) and the identification of UDN 105. In one example, the notification may be a Change of Authorization (CoA) and/or a Re-Auth-Request (RAR) message.

In the second example process, at operation 230, CPF 205 obtains, from UE 110(1), a notification that UDN 105 has been created. The notification includes an identification of UDN 105. In one example, the notification may be a PDU session modification request Non-Access Stratum Session Modification (NAS-SM) message, or a PDU session establishment message, triggered by the software application. In a further example, the PDU session modification/establishment request may include a custom Information Element (IE) that includes the UDN ID. At operation 235, CPF 205 provides, to authentication service 130, a request to authenticate UE 110(1). The request includes the identification of UDN 105, and may further include a Subscription Permanent Identifier (SUPI) of UE 110(1) and/or a corresponding Data Network Name (DNN). Authentication service 130 may authenticate UE 110(1), and may also authorize the creation of UDN 105. At operation 240, CPF 205 obtains, from authentication service 130, a response to the request to authenticate UE 110(1). The response includes an indication of the multicast group configured to include UE 110(2) (e.g., MGID, multicast group address, etc.), and may also include the identification of UDN 105.

At operation 245, CPF 205 creates a dedicated Quality of Service (QoS) flow associated with the UDN ID and MGID for the PDU session. At operation 250, CPF 205 triggers a Next Generation Application Protocol (NGAP)/NAS-SM PDU session establishment/modification procedure toward UE 110(1) (e.g., via cellular AP 140). CPF 205 may provide, to UE 110(1), one or more Quality Flow Identifiers (QFIs), one or more QoS Class Identifiers (QCIs), and/or 5G QoS Identifiers (5QIs). Any suitable QFI, QCI, and/or 5QI may be employed. CPF 205 may also provide, to UE 110(1), Service Data Flow (SDF) filters for the multicast group address to enable UE 110(1) to classify Uplink (UL) and/or Downlink (DL) multicast traffic belonging to UDN 105.

At operation 255, CPF 205 provides, to UPF 210, the indication of the multicast group and the identification of UDN 105. CPF 205 may trigger a Packet Forwarding Control Protocol (PFCP) session establishment/modification toward UPF 210 with certain information in order to create a dedicated QoS flow for the identification of UDN 105. The information may include the indication of the multicast group, which may be provided in a custom IE, and the identification of UDN 105. The information may further include one or more QFIs, 5QIs, QoS profile(s), and/or Packet Detection Rule(s) (PDR(s))/Forwarding Action Rule(s) (FAR(s)) to classify UL/DL multicast traffic belonging to UDN 105. The indication of the multicast group and the identification of UDN 105 may include or be a part of the indication that UE 110(1) is attempting to connect to UDN 105 via the cellular network. At operation 260, UPF 210 joins a multicast group configured to include UE 110(2) by providing, to network node 125, an IGMP join request that includes the multicast group address corresponding to UDN 105 on behalf of UE 110(1).

At operation 265, UPF 210 creates a dedicated QoS flow within a PDU session of UE 110(1) for traffic pertaining to UDN 105. This may involve constructing a mapping between the QoS flow and the UDN ID/MGID. UPF 210 may also establish a default QoS flow. UPF 210 may further install PDR(s)/FAR(s) for classifying UL/DL packets of the multicast group address of UDN 105. A DL/UL PDR may include rules to identify DL/UL packets having a destination IP address matching the multicast group address. A DL FAR may include rules for forwarding the DL packets in accordance with the QoS flow(s) associated with UDN 105. An UL FAR may include rules for forwarding UL packets from a QoS flow to the wired network and also for invoking the DL FAR to forward those packets to all other QoS flows belonging to UDN 105.

In one example, UPF 210 may construct a flood list for UDN 105 and add a dedicated QoS flow for UE 110(1) to the flood list. The flood list may include all QoS flows belonging to UDN 105 for all UEs (e.g., UE 110(1), UE 110(2), etc.). UPF 210 may further add, to the flood list, a dedicated QoS flow for another UE that is attempting to connect to UDN 105 via the cellular network. Thus, instead of constructing a new flood list, UPF 210 may add the other UE to the previously constructed flood list. UPF 210 may thereby avoid performing another multicast join procedure or PDR/ FAR installation because UPF 210 already joined the multicast group and installed the relevant PDR(s)/FAR(s) in response to UE 110(1) attempting to connect to UDN 105 via the cellular network.

In one example, CPF 205 may intelligently select UPF 210 to service UDN 105. CPF 205 may obtain, from authentication service 130, a list/mapping of UDN IDs to multicast group addresses and UPF addresses (e.g., as part of operation 225 or operation 240). The list/mapping may be maintained by authentication service 130. CPF 205 may parse the list, determine the UDN ID for UDN 105, and identify the UPF associated with UDN 105 (here, UPF 210). Accordingly, CPF 205 may assign UPF 210 to service UDN 105. In response to assigning UPF 210 to service UDN 105, CPF 205 provides, to UPF 210, the indication that UE 110(1) is attempting to connect to UDN 105 via the cellular network. CPF 205 may provide this indication at operation 255 with the indication of the multicast group and the identification of UDN 105. This may ensure that all UEs in UDN are served by the same UPF (here, UPF 210). In a further example, CPF 205 may assign UPF 210 to service another UE that is attempting to connect to UDN 105 via the cellular network. Thus, CPF 205 may optimize UPF selection when multiple private 5G users are part of UDN 105.

Figure 3:
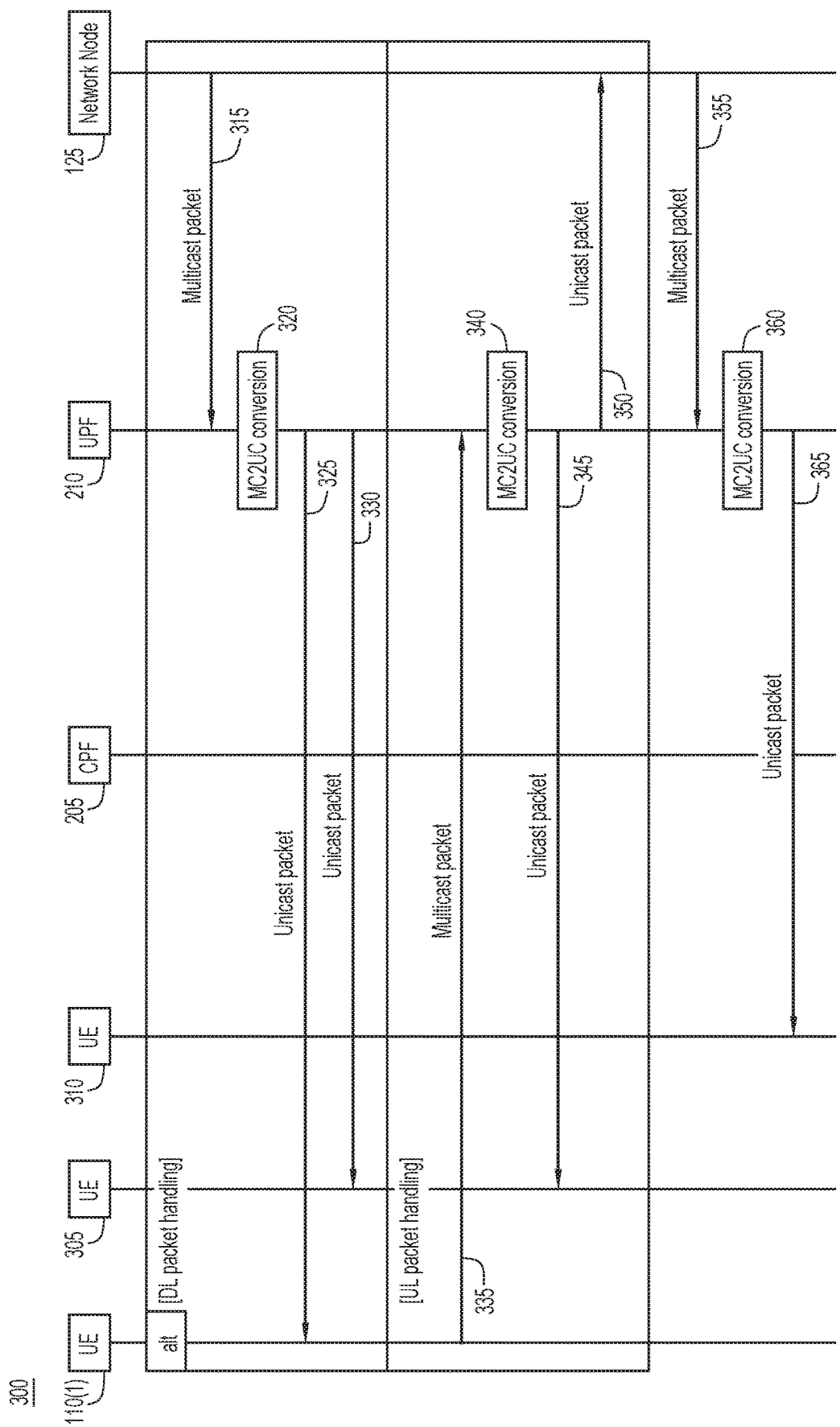
FIG. 3 illustrates a call flow diagram including data plane messages to establish cellular access of a UDN, according to an example embodiment.

With continued reference to FIGS. 1 and 2, FIG. 3 illustrates an example call flow diagram 300 including data plane messages to establish cellular access of UDN 105. The data plane messages may be transmitted between UE 110(1), UE 305, UE 310, CPF 205, UPF 210, and network node 125. In this example, UE 110(1) and UE 305 are connected to UDN 105 via the cellular network, and UE 310 is connected to another UDN via the cellular network. In this example, UE 110(1), UE 305, and UE 310 have established respective PDU sessions. A first dedicated QoS flow is created for UE 110(1) and corresponds to UDN 105 (e.g., the UDN ID/MGID associated with UDN 105). A second dedicated QoS flow is created for UE 305 and corresponds to UDN 105. A third dedicated QoS flow is created for UE 310 and corresponds to the other UDN.

Operations 315-330 relate to processing of a DL multicast packet associated with UDN 105, and operations 335-350 relate to processing of an UL multicast packet associated with UDN 105. With regard to the DL multicast packet embodiment, at operation 315, UPF 210 obtains a multicast packet from UE 110(2) via the WLAN. The multicast packet belongs to UDN 105. As shown, the multicast packet may be obtained further via network node 125 (e.g., over a wired access/software-defined access fabric). The multicast packet may include a destination IP address set to the multicast group address associated with UDN 105.

At operation 320, UPF 210 may convert the multicast packet to a unicast packet. In one example, UPF 210 may convert the multicast packet to the unicast packet based on the flood list constructed by UPF 210 for UDN 105. More specifically, UPF 210 may identify the multicast group address of the multicast packet and look up any QoS flows stored in the flood list that correspond to UDN 105 (which is associated with the multicast group address). UPF 210 may determine that the multicast group address is associated with the UDN ID of UDN 105, look up the flood list corresponding to the UDN ID of UDN 105, and identify the dedicated QoS flows corresponding to UE 110(1) and UE 305, which are associated with the UDN ID of UDN 105. Thus, the flood list may be used to perform MC2UC conversion of DL multicast packets belonging to UDN 105.

UPF 210 may further flood DL unicast packets to any dedicated QoS flows associated with the UDN ID of UDN 105 (here, UE 110(1) and UE 305). At operation 325, UPF 210 provides the unicast packet to UE 110(1) via the cellular network. UPF 210 forwards the unicast packet to UE 110(1) in accordance with the first dedicated QoS flow. At operation 330, UPF 210 provides the unicast packet to UE 305 via the cellular network. UPF 210 forwards the unicast packet to UE 305 in accordance with the second dedicated QoS flow. UPF 210 may refrain from sending a unicast packet to UE 110(2), even though UE 110(2) belongs to UDN 105, because UE 110(2) sent the multicast packet. UPF 210 may also refrain from sending a unicast packet to UE 310 because UE 310 does not belong to UDN 105.

With regard to the UL multicast packet embodiment, at operation 335, UPF 210 obtains a multicast packet from UE 110(1) via the cellular network. The multicast packet belongs to UDN 105. The multicast packet may include a destination IP address set to the multicast group address associated with UDN 105. At operation 340, UPF 210 may convert the multicast packet to a unicast packet. In one example, UPF 210 may convert the multicast packet to the unicast packet based on the flood list constructed by UPF 210 for UDN 105. More specifically, UPF 210 may identify the multicast group address of the multicast packet and look up any QoS flows stored in the flood list that correspond to UDN 105 (which is associated with the multicast group address). For instance, UPF 210 may determine that the multicast group address is associated with the UDN ID of UDN 105, look up the flood list corresponding to the UDN ID of UDN 105, and identify the dedicated QoS flows corresponding to UE 305 and UE 110(2), which are associated with the UDN ID of UDN 105. Thus, the flood list may be used to perform MC2UC conversion of UL multicast packets belonging to UDN 105.

UPF 210 may further flood UL unicast packets to any dedicated QoS flows associated with the UDN ID of UDN 105 (here, UE 305 and UE 110(2)). At operation 345, UPF 210 provides the unicast packet to UE 305 via the cellular network. UPF 210 forwards the unicast packet to 305 in accordance with the second dedicated QoS flow. At operation 350, UPF 210 provides the unicast packet to UE 110(2) via the WLAN. UPF 210 forwards the unicast packet to UE 110(1) to the network node 125 (e.g., over a wired access/software-defined access fabric) in accordance with the dedicated QoS flow associated with UE 110(2). UPF 210 may refrain from sending a unicast packet to UE 110(1), even though UE 110(1) belongs to UDN 105, because UE 110(1) sent the UL multicast packet. UPF 210 may also refrain from sending a unicast packet to UE 310 because UE 310 does not belong to UDN 105.

Operations 355-365 relate to processing of a DL multicast packet associated with the other UDN (i.e., the UDN that includes UE 310). At operation 355, UPF 210 obtains a DL multicast packet from network node 125 (e.g., over a wired access/software-defined access fabric). The multicast packet belongs to the other UDN, and may include a destination IP address set to the multicast group address associated with the other UDN. At operation 360, UPF 210 may convert the multicast packet to a unicast packet. In one example, UPF 210 may convert the multicast packet to the unicast packet based on the flood list constructed by UPF 210 for the other UDN. More specifically, UPF 210 may identify the multicast group address of the multicast packet and look up any QoS flows stored in the flood list that correspond to the other UDN (which is associated with the multicast group address). For instance, UPF 210 may determine that the multicast group address is associated with the UDN ID of the other UDN, look up the flood list corresponding to the UDN ID of the other UDN, and identify the dedicated QoS flows corresponding to UE 310, which is associated with the UDN ID of the other UDN. Thus, the flood list may be used to perform MC2UC conversion of DL multicast packets belonging to UDN 105.

UPF 210 may flood DL unicast packets to any dedicated QoS flows associated with the UDN ID of the other UDN (here, UE 310). At operation 365, UPF 210 provides the unicast packet to UE 310 via the cellular network. UPF 210 forwards the unicast packet to UE 310 in accordance with the third dedicated QoS flow. UPF 210 may refrain from sending a unicast packet to UEs 110(1) or 305 because UEs 110(1) and 305 do not belong to the other UDN. It will be appreciated that similar operations described in accordance with FIG. 3 may be performed with respect to processing an UL multicast packet (e.g., sent by UE 310) associated with the other UDN.

Figure 4:
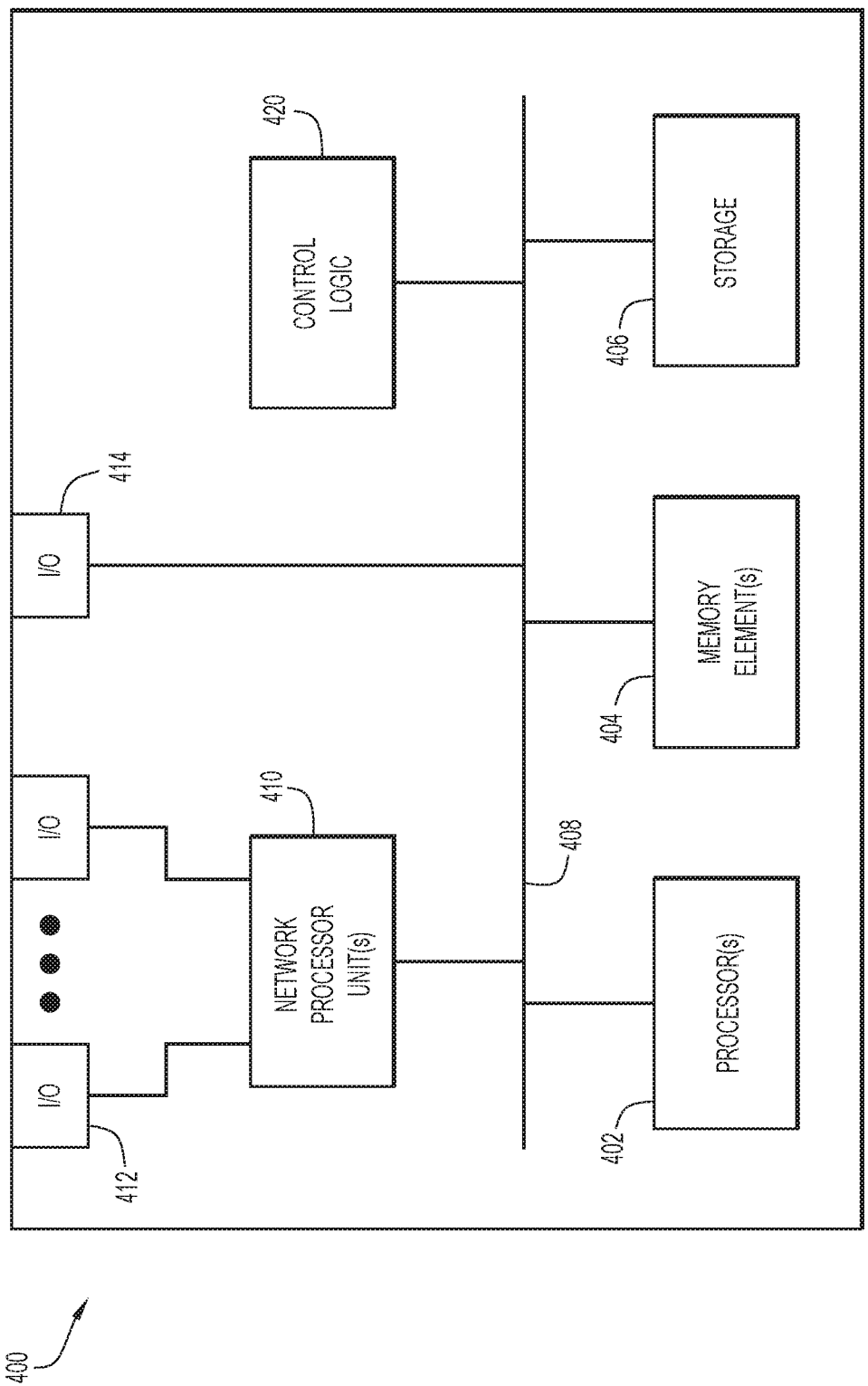
FIG. 4 illustrates a hardware block diagram of a computing device configured to provide cellular access of a UDN, according to an example embodiment.

Referring to FIG. 4, FIG. 4 illustrates a hardware block diagram of a computing device 400 that may perform functions associated with operations discussed herein in connection with the techniques depicted in FIGS. 1-3. In various embodiments, a computing device, such as computing device 400 or any combination of computing devices 400, may be configured as any entity/entities as discussed for the techniques depicted in connection with FIGS. 1-3 in order to perform operations of the various techniques discussed herein.

In at least one embodiment, computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) now known or hereafter developed. Thus, the network processor unit(s) 410 and/or network I/O interface(s) 412 may include suitable interfaces for receiving, transmitting, and/or otherwise communicating data and/or information in a network environment.

I/O interface(s) 414 allow for input and output of data and/or information with other entities that may be connected to computer device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device 400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 5:
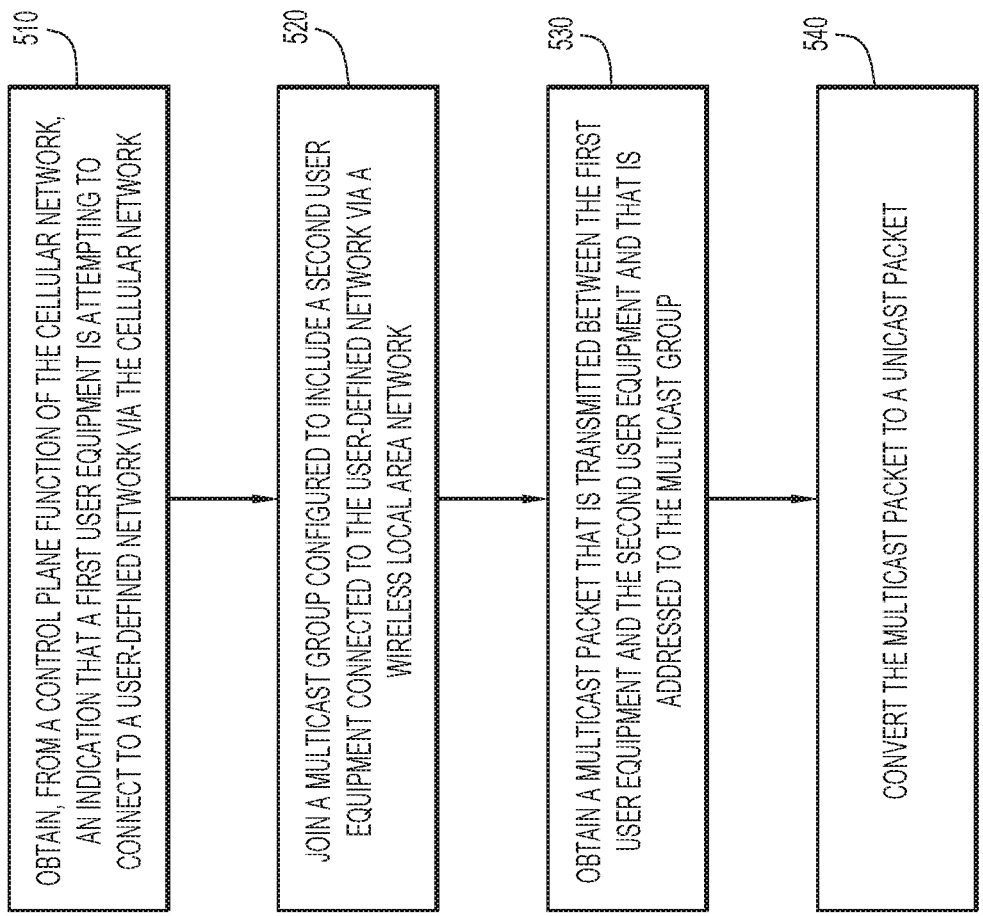
FIG. 5 illustrates a flowchart of a method for providing cellular access of a UDN, according to an example embodiment.

FIG. 5 is a flowchart of an example method 500 for providing cellular access of a UDN. At operation 510, a user plane function of a cellular network obtains, from a control plane function of the cellular network, an indication that a first user equipment is attempting to connect to a user-defined network via the cellular network. At operation 520, the user plane function joins a multicast group configured to include a second user equipment connected to the user-defined network via a wireless local area network. At operation 530, the user plane function obtains a multicast packet that is transmitted between the first user equipment and the second user equipment and that is addressed to the multicast group. At operation 540, the user plane function converts the multicast packet to a unicast packet.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

In this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: at a user plane function of a cellular network: obtaining, from a control plane function of the cellular network, an indication that a first user equipment is attempting to connect to a user-defined network via the cellular network; joining a multicast group configured to include a second user equipment connected to the user-defined network via a wireless local area network; obtaining a multicast packet that is transmitted between the first user equipment and the second user equipment and that is addressed to the multicast group; and converting the multicast packet to a unicast packet.

In one example, obtaining the multicast packet includes obtaining the multicast packet from the second user equipment via the wireless local area network, the method further comprising: at the user plane function: providing the unicast packet to the first user equipment via the cellular network.

In one example, obtaining the multicast packet includes obtaining the multicast packet from the first user equipment via the cellular network, the method further comprising: at the user plane function: providing the unicast packet to the second user equipment via the wireless local area network.

In one example, the method further comprises: at the user plane function: constructing a flood list for the user-defined network; and adding a dedicated quality of service flow for the first user equipment to the flood list, wherein: converting the multicast packet to the unicast packet includes converting the multicast packet based on the flood list. In a further example, the method further comprises: at the user plane function: adding, to the flood list, a dedicated quality of service flow for a third user equipment that is attempting to connect to the user-defined network via the cellular network.

In one example, the method further comprises: at the control plane function: assigning the user plane function to service the user-defined network; and in response to assigning the user plane function to service the user-defined network: providing, to the user plane function, the indication that the first user equipment is attempting to connect to the user-defined network via the cellular network; and assigning the user plane function to service a third user equipment that is attempting to connect to the user-defined network via the cellular network.

In one example, the method further comprises: at the control plane function: obtaining, from an authentication service, a notification that the user-defined network has been created, wherein the notification includes an indication of the multicast group and an identification of the user-defined network; and providing, to the user plane function, the indication of the multicast group and the identification of the user-defined network.

In one example, the method further comprises: at the control plane function: obtaining, from the first user equipment, a notification that the user-defined network has been created, wherein the notification includes an identification of the user-defined network; providing, to an authentication service, a request to authenticate the first user equipment, wherein the request includes the identification of the user-defined network; obtaining, from the authentication service, a response to the request to authenticate the first user equipment, wherein the response includes an indication of the multicast group; and providing, to the user plane function, the indication of the multicast group and the identification of the user-defined network.

In another form, an apparatus is provided. The apparatus comprises: a network interface configured to obtain or provide network communications; and one or more processors coupled to the network interface, wherein the one or more processors are configured to: obtain, from a control plane function of a cellular network, an indication that a first user equipment is attempting to connect to a user-defined network via the cellular network; join a multicast group configured to include a second user equipment connected to the user-defined network via a wireless local area network; obtain a multicast packet that is transmitted between the first user equipment and the second user equipment and that is addressed to the multicast group; and convert the multicast packet to a unicast packet.

In another form, one or more non-transitory computer readable storage media are provided. The non-transitory computer readable storage media are encoded with instructions that, when executed by one or more processors of a user plane function of a cellular network, cause the one or more processors to: obtain, from a control plane function of the cellular network, an indication that a first user equipment is attempting to connect to a user-defined network via the cellular network; join a multicast group configured to include a second user equipment connected to the user-defined network via a wireless local area network; obtain a multicast packet that is transmitted between the first user equipment and the second user equipment and that is addressed to the multicast group; and convert the multicast packet to a unicast packet.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   at a user plane function of a cellular network:
   obtaining, from a control plane function of the cellular network, an indication that a first user equipment is attempting to connect to a user-defined network via the cellular network;
   joining a multicast group configured to include a second user equipment connected to the user-defined network via a wireless local area network;
   obtaining a multicast packet that is transmitted between the first user equipment and the second user equipment and that is addressed to the multicast group; and
   converting the multicast packet to a unicast packet.

2. The method of claim 1, wherein obtaining the multicast packet includes obtaining the multicast packet from the second user equipment via the wireless local area network, the method further comprising:
   at the user plane function:
   providing the unicast packet to the first user equipment via the cellular network.

3. The method of claim 1, wherein obtaining the multicast packet includes obtaining the multicast packet from the first user equipment via the cellular network, the method further comprising:
   at the user plane function:
   providing the unicast packet to the second user equipment via the wireless local area network.

4. The method of claim 1, further comprising:
   at the user plane function:
   constructing a flood list for the user-defined network; and
   adding a dedicated quality of service flow for the first user equipment to the flood list, wherein:
   converting the multicast packet to the unicast packet includes converting the multicast packet based on the flood list.

5. The method of claim 4, further comprising:
   at the user plane function:
   adding, to the flood list, a dedicated quality of service flow for a third user equipment that is attempting to connect to the user-defined network via the cellular network.

6. The method of claim 1, further comprising:
   at the control plane function:
   assigning the user plane function to service the user-defined network; and
   in response to assigning the user plane function to service the user-defined network:
   providing, to the user plane function, the indication that the first user equipment is attempting to connect to the user-defined network via the cellular network; and
   assigning the user plane function to service a third user equipment that is attempting to connect to the user-defined network via the cellular network.

7. The method of claim 1, further comprising:
   at the control plane function:
   obtaining, from an authentication service, a notification that the user-defined network has been created, wherein the notification includes an indication of the multicast group and an identification of the user-defined network; and
   providing, to the user plane function, the indication of the multicast group and the identification of the user-defined network.

8. The method of claim 1, further comprising:
   at the control plane function:
   obtaining, from the first user equipment, a notification that the user-defined network has been created, wherein the notification includes an identification of the user-defined network;
   providing, to an authentication service, a request to authenticate the first user equipment, wherein the request includes the identification of the user-defined network;
   obtaining, from the authentication service, a response to the request to authenticate the first user equipment, wherein the response includes an indication of the multicast group; and
   providing, to the user plane function, the indication of the multicast group and the identification of the user-defined network.

9. An apparatus comprising:
   a network interface configured to obtain or provide network communications; and
   one or more processors coupled to the network interface, wherein the one or more processors are configured to:
   obtain, from a control plane function of a cellular network, an indication that a first user equipment is attempting to connect to a user-defined network via the cellular network;
   join a multicast group configured to include a second user equipment connected to the user-defined network via a wireless local area network;
   obtain a multicast packet that is transmitted between the first user equipment and the second user equipment and that is addressed to the multicast group; and
   convert the multicast packet to a unicast packet.

10. The apparatus of claim 9, wherein the one or more processors are further configured to:
  obtain the multicast packet from the second user equipment via the wireless local area network; and
  provide the unicast packet to the first user equipment via the cellular network.

11. The apparatus of claim 9, wherein the one or more processors are further configured to:
  obtain the multicast packet from the first user equipment via the cellular network; and
  provide the unicast packet to the second user equipment via the wireless local area network.

12. The apparatus of claim 9, wherein the one or more processors are further configured to:
  construct a flood list for the user-defined network;
  add a dedicated quality of service flow for the first user equipment to the flood list; and
  convert the multicast packet based on the flood list.

13. The apparatus of claim 12, wherein the one or more processors are further configured to:
  add, to the flood list, a dedicated quality of service flow for a third user equipment that is attempting to connect to the user-defined network via the cellular network.

14. A system comprising the apparatus of claim 9 and the control plane function, wherein the control plane function is configured to:
  assign the apparatus to service the user-defined network; and
  in response to assigning the apparatus to service the user-defined network:
    provide, to the apparatus, the indication that the first user equipment is attempting to connect to the user-defined network via the cellular network; and
    assign the apparatus to service a third user equipment that is attempting to connect to the user-defined network via the cellular network.

15. A system comprising the apparatus of claim 9 and the control plane function, wherein the control plane function is configured to:
  obtain, from an authentication service, a notification that the user-defined network has been created, wherein the notification includes an indication of the multicast group and an identification of the user-defined network; and
  provide, to the apparatus, the indication of the multicast group and the identification of the user-defined network.

16. A system comprising the apparatus of claim 9 and the control plane function, wherein the control plane function is configured to:
  obtain, from the first user equipment, a notification that the user-defined network has been created, wherein the notification includes an identification of the user-defined network;
  provide, to an authentication service, a request to authenticate the first user equipment, wherein the request includes the identification of the user-defined network;
  obtain, from the authentication service, a response to the request to authenticate the first user equipment, wherein the response includes an indication of the multicast group; and
  provide, to the apparatus, the indication of the multicast group and the identification of the user-defined network.

17. One or more non-transitory computer readable storage media encoded with instructions that, when executed by one or more processors of a user plane function of a cellular network, cause the one or more processors to:
  obtain, from a control plane function of the cellular network, an indication that a first user equipment is attempting to connect to a user-defined network via the cellular network;
  join a multicast group configured to include a second user equipment connected to the user-defined network via a wireless local area network;
  obtain a multicast packet that is transmitted between the first user equipment and the second user equipment and that is addressed to the multicast group; and
  convert the multicast packet to a unicast packet.

18. The one or more non-transitory computer readable storage media of claim 17, wherein the instructions further cause the one or more processors to:
  obtain the multicast packet from the second user equipment via the wireless local area network; and
  provide the unicast packet to the first user equipment via the cellular network.

19. The one or more non-transitory computer readable storage media of claim 17, wherein the instructions further cause the one or more processors to:
  obtain the multicast packet from the first user equipment via the cellular network; and
  provide the unicast packet to the second user equipment via the wireless local area network.

20. The one or more non-transitory computer readable storage media of claim 17, wherein the instructions further cause the one or more processors to:
  construct a flood list for the user-defined network;
  add a dedicated quality of service flow for the first user equipment to the flood list; and
  convert the multicast packet based on the flood list.

\* \* \* \* \*